(12) United States Patent
Hirschfelder et al.

(10) Patent No.: US 7,906,054 B2
(45) Date of Patent: Mar. 15, 2011

(54) DECORATED INJECTION-MOULDED ARTICLE, METHOD FOR PRODUCING ONE SUCH ARTICLE, AND TRANSFER FILM FOR USING IN ONE SUCH METHOD

(75) Inventors: Andreas Hirschfelder, Furth (DE); Uwe Reuther, Nuremberg (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 782 days.

(21) Appl. No.: 11/661,464

(22) PCT Filed: Aug. 23, 2005

(86) PCT No.: PCT/DE2005/001486
§ 371 (c)(1),
(2), (4) Date: May 18, 2007

(87) PCT Pub. No.: WO2006/021199
PCT Pub. Date: Mar. 2, 2006

(65) Prior Publication Data
US 2007/0269671 A1   Nov. 22, 2007

(30) Foreign Application Priority Data
Aug. 27, 2004  (DE) .......................... 10 2004 041 833

(51) Int. Cl.
*B29C 45/14* (2006.01)
*B29C 45/16* (2006.01)

(52) U.S. Cl. ......... 264/251; 264/254; 264/255; 264/247; 264/275

(58) Field of Classification Search .................... None
See application file for complete search history.

(56) References Cited

U.S. PATENT DOCUMENTS

| | | | | |
|---|---|---|---|---|
| 4,330,578 A * | 5/1982 | Nishihira et al. | ............... | 428/13 |
| 4,969,257 A * | 11/1990 | Sato et al. | ........................ | 29/842 |
| 5,714,231 A | 2/1998 | Reinhart | | |
| 5,988,762 A | 11/1999 | Asada et al. | | |
| 6,017,622 A | 1/2000 | Atake | | |
| 6,129,985 A | 10/2000 | Ohsumi et al. | | |
| 6,875,301 B2 * | 4/2005 | Kauppi et al. | ................ | 156/245 |
| 2004/0125023 A1 | 7/2004 | Fujii et al. | | |

(Continued)

FOREIGN PATENT DOCUMENTS

DE    4301444    7/1994

(Continued)

OTHER PUBLICATIONS

Machine translation of JP 6-106572 produced by http://dossier1.ipdl.inpit.go.jp/AIPN/odse_top_dn.ipdl?N0000=7400.*

*Primary Examiner* — Edmund H. Lee
(74) *Attorney, Agent, or Firm* — Hoffman & Baron, LLP

(57) ABSTRACT

The invention concerns a decorated injection molded article and a process for the production of a decorated injection molded article by means of inmold technology, wherein inter alia an IMD-capable transfer film with a release layer of highly cross-linked plastic material is used. The decorated injection molded article formed has a high level of optical quality based on double-sided coating of a decorative element which is optionally joined to an auxiliary film web which is formed by a transfer layer of a transfer film and provides a decoration for the injection molded article, by means of injection molding.

10 Claims, 7 Drawing Sheets

U.S. PATENT DOCUMENTS

| | | | |
|---|---|---|---|
| 2005/0255314 A1* | 11/2005 | Wang et al. | 428/352 |
| 2005/0260386 A1 | 11/2005 | Heinrich et al. | |
| 2006/0123574 A1* | 6/2006 | Storkel et al. | 15/143.1 |

FOREIGN PATENT DOCUMENTS

| | | |
|---|---|---|
| DE | 19756558 | 8/1998 |
| DE | 10221482 | 9/2003 |
| DE | 10204348 | 11/2003 |
| DE | 10236810 | 2/2004 |
| JP | 04075085 | 3/1982 |
| JP | 58132529 | 8/1983 |
| JP | 58217332 | 12/1983 |
| JP | 62128720 | 6/1987 |
| JP | 01080510 | 3/1989 |
| JP | 03163585 | 7/1991 |
| JP | 3231821 | 10/1991 |
| JP | 03288700 | 12/1991 |
| JP | 6-106572 A * | 4/1994 |
| JP | 07080891 | 3/1995 |
| JP | 8-510176 | 10/1996 |
| JP | 9183142 | 7/1997 |
| JP | 409-239779 | 9/1997 |
| JP | 10180801 | 7/1998 |
| JP | 2001-030286 | 2/2001 |
| JP | 2001088166 | 4/2001 |
| JP | 2002293094 | 10/2002 |
| JP | 2005-535484 | 11/2005 |
| WO | WO 2004/043669 | 5/2004 |
| WO | WO 2005/070647 | 8/2005 |

* cited by examiner

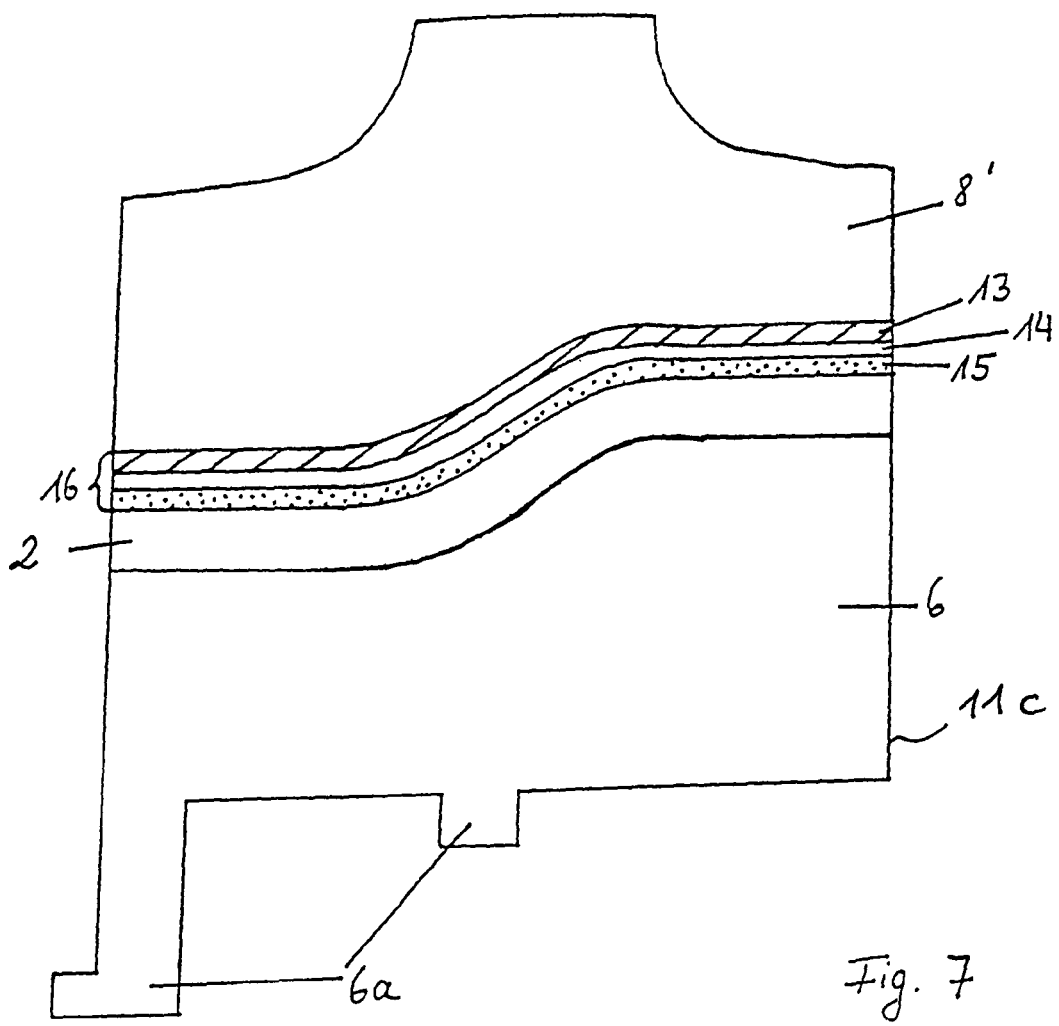

DECORATED INJECTION-MOULDED ARTICLE, METHOD FOR PRODUCING ONE SUCH ARTICLE, AND TRANSFER FILM FOR USING IN ONE SUCH METHOD

This application claims priority based on an International Application filed under the Patent Cooperation Treaty, PCT/DE2005/001486, filed on Aug. 23, 2005 and German Application No. 102004041833, filed on Aug. 27, 2004.

FIELD OF THE INVENTION

The invention concerns a decorated injection molded article which is formed from at least one injected plastic material and at least one decorative element which is mechanically fixedly joined thereto and which is formed by a transfer layer of a transfer film and provides a decoration for the injection molded article. The invention further concerns processes for the production of a decorated injection molded article using at least one decorative element which is formed by a transfer layer of a transfer film and provides a decoration for the injection molded article, wherein the at least one decorative element is arranged in at least one injection molding mold and the at least one injection molding mold is filled with plastic injection material. Decoration processes of that kind for injection moldings are usually referred to as inmold decoration processes or IMD injection molding processes. The invention further concerns a transfer film for use in such a process, wherein the transfer film has at least a carrier film, a release layer arranged on the carrier film and a transfer layer arranged on the side of the release layer remote from the carrier film, as a decorative element, wherein the transfer layer adjoining the release layer has at least one second layer, adjoining the second layer at least one decorative layer and adjoining the decorative layer on the side of the transfer film remote from the carrier film at least one first layer.

BACKGROUND OF THE INVENTION

Such decorated injection molded articles, processes for the production thereof and inmold-capable transfer films or IMD films are known per se. Thus DE 102 21 482 C1 discloses an apparatus for the production of a molding comprising a hardening injection molding material which is decorated by inmold injection with a stamping film comprising a carrier film and a decorative layer. In that case the stamping film is introduced into the injection molding tool, the decorative layer of the stamping film facing towards an upper part of the mold. When the injection molding material is injected through an injection passage into the injection molding mold cavity of the apparatus, the stamping film is caused to adhere closely to the visible side of the injection molded part. In that situation the stamping film is joined to the injection molding material which after hardening is removed from the injection molding mold. After the carrier film is pulled off the decorative layer the decorated molding is finished. Injection molded articles which are decorated in that way are used in particular in relation to internal parts of motor vehicles such as door strips, strips in instrument panels, shift lever covers, central console covers and in relation to external parts of motor vehicles such as door ram guard strips, covers on A, B and C pillars and in the audio and video fields in relation to decorative strips on the casings of radios and televisions. A large number of further areas of use is possible.

DE 102 36 810 A1 discloses partially structured multi-layered films which are suitable for use in injection molding molds. Such an IMD-capable multi-layer film or a multi-layer film for inmold decoration of injection molded parts has a carrier film with a decorative layer for transfer on to the injection molded part. The carrier film is removed after the decorative element has been applied to the injection molded body. The decorative element has a release layer, a protective lacquer layer, a structure layer with a spatial structure, an intermediate layer, a reflection layer and an adhesive layer. The release layer serves in that case for releasing the decorative element from the carrier and usually comprises a wax material.

As JP 62128720 A discloses, IMD films are usually guided between a fixed and a movable part of the injection molding mold by way of a film advance device. In the case of individual image representations in the region of the decorative film which is to be applied by lamination, the IMD film is also positioned in the correct position relative to the injection molding mold by way of sensors and position markings on the IMD film before the injection molding mold is closed and the hot plastic injection material is injected behind the IMD film.

SUMMARY OF THE INVENTION

Now, the object of the invention is to improve the optical quality and operational efficiency of injection molded articles decorated with decorative elements. The invention further seeks to provide a process for the production of injection molded articles decorated with decorative elements, which permits the production of such injection molded articles with improved optical quality and operational efficiency, in a simple and inexpensive fashion. The invention further seeks to provide a suitable transfer film for use for such a process.

For the decorated injection molded article which is formed from at least one injected plastic material and at least one decorative element which is mechanically fixedly connected thereto and which is formed by a transfer layer of a transfer film and provides a decoration for the injection molded article, that object is attained in that a) both sides of at least one first decorative element are at least partially covered with at least one injection molded plastic material, or b) a first side of at least one first decorative element is at least partially covered with at least one injection molded plastic material and a second side of the at least one first decorative element is arranged on a thermoplastic auxiliary film web which is three-dimensionally shaped by deep drawing, wherein the side of the auxiliary film web that is remote from the at least one decorative element is at least partially covered with an injection molded plastic material.

The application of injection molded plastic material to both sides of a decorative element or a decorative element arranged on an auxiliary film web leads to decorative components which satisfy very high demands in terms of sheen, surface quality and depth effect of the visible side of the decorated injection molded article. The three-dimensional effect which can be achieved for the decoration exceeds the depth effect of decorated injection molded articles which are produced using conventional IMD technology by a multiple. Double-sided application of injection molded plastic material to the first decorative element or the first decorative element inclusive of the auxiliary film web provides that the surfaces of the decorative element are protected from mechanical or corrosive attack and thus their decorative appearance is maintained unchanged over long periods of time.

For the process for the production of a decorated injection molded article using at least one decorative element which is formed by a transfer layer of a transfer film and provides a decoration for the injection molded article, wherein the at least one decorative element is arranged in at least one injection molding mold and the at least one injection molding mold is filled with plastic injection material, the object is attained in that a) both sides of at least one first decorative element are at least partially covered with the plastic injection material, or b) at least one first decorative element which has a first and a second side is mechanically fixedly secured with its second side to a thermoplastic auxiliary film web, in particular by stamping, the auxiliary film web inclusive of the first decorative element is three-dimensionally shaped by deep drawing, and the first side of the first decorative element and a side of the auxiliary film web that is remote from the first decorative element are at least partially covered with plastic injection material.

A process of that kind makes it possible to produce decorated injection molded articles, as already described hereinbefore, of high optical quality and extraordinary operational efficiency. Such a process can also be carried out quickly and inexpensively.

In that respect the auxiliary film web is preferably of a layer thickness in the range of between 175 and 1200 µm. Suitable auxiliary film webs have a certain stiffness, at least after the deep drawing operation. Preferred materials for the auxiliary film web are ABS, ASA, PC, PMMA, PS, PBT or mixtures of those materials, in particular ABS/PC blends, as well as thermoplastic olefins (TPO) such as for example PP or PE. In that respect it is possible to use either transparent or opaque auxiliary film webs.

In addition, for a transfer film for use in a process according to the invention which has at least a carrier film, a release layer arranged on the carrier film and a transfer layer arranged on the side of the release layer that is remote from the carrier film, as a decorative element, wherein the transfer layer has adjoining the release layer at least one second layer, adjoining the second layer at least one decorative layer and adjoining the decorative layer on the side of the transfer film that is remote from the carrier film at least one first layer, the stated object is attained in that the release layer is a plastic layer which is highly cross-linked by radiation hardening, isocyanate hardening or acid hardening. A release layer of that kind can be detached from the transfer layer without any residue so that the second layer of the transfer layer can be satisfactorily joined to a plastic injection material. With the wax-like or silicone-bearing release layers which are usually employed, residues on the second layer or between the second layer and the plastic injection material give rise to adhesion problems and optical irregularities. In contrast, it is possible to produce injection molded articles of high optical quality and operational efficiency, which are satisfactorily decorated with the transfer film according to the invention.

For the process in case a) it has proven worthwhile if accordingly a transfer film is used to produce the decorated injection molded article, which has at least a carrier film, a release layer arranged on the carrier film and a transfer layer arranged on the side of the release layer that is remote from the carrier film, as a first decorative element, wherein the transfer film is arranged in a first injection molding mold, the first injection molding mold is filled with a first plastic injection material in such a way that on its side remote from the carrier film the transfer film is at least partially covered with the first plastic injection material, wherein the first plastic injection material is hardened to afford a first plastic material, the first plastic material inclusive of the transfer film joined thereto is taken out of the first injection molding mold and the carrier film inclusive of the release layer is removed from the transfer film and wherein the first plastic material decorated with the transfer layer in that way is arranged in a second injection molding mold and at least the side of the transfer layer which is uncovered by the first plastic material is at least partially over-injected with a second plastic injection material.

For the process in case b) it has proven worthwhile if a transfer film is used for production of the decorated injection molded article, which has at least a carrier film, a release layer arranged on the carrier film and a transfer layer arranged on the side of the release layer that is remote from the carrier film, as a first decorative element, the transfer film is stamped on to the auxiliary film web in such a way that the transfer layer is mechanically fixedly joined to the auxiliary film web, the auxiliary film web inclusive of the transfer film is deep-drawn, the auxiliary film web inclusive of the transfer film is then arranged in a first injection molding mold and the first injection molding mold is filled with a first plastic injection material in such a way that the auxiliary film web on its side remote from the transfer film is at least partially covered with the first plastic injection material, the first plastic injection material is hardened to afford a first plastic material, the first plastic material inclusive of the transfer film joined thereto is taken out of the first injection molding mold and the carrier film inclusive of the release layer is removed, the first plastic material decorated with the transfer layer in that way is now arranged in a second injection molding mold and at least the side of the transfer layer that is still uncovered is at least partially over-injected with a second plastic injection material.

It has proven worthwhile if in case a) one of the two sides of the first decorative element is at least partially covered with a first plastic material and the other of the two sides of the first decorative element is at least partially covered with a second plastic material and in case b) the side of the auxiliary film web that is remote from the at least one decorative element is at least partially covered with a first plastic material and the first side of the first decorative element is at least partially covered with a second plastic material. Such a configuration for the injection molded article makes it possible to achieve particular optical effects, as will be described hereinafter.

It is particularly preferred if in case a) the one of the two sides of the first decorative element is completely covered with the first plastic material and the other of the two sides of the first decorative element is also completely covered with the second plastic material, wherein the first and/or the second plastic material is/are transparent and if in case b) the first side of the first decorative element is completely covered with the second plastic material and the side of the auxiliary film web that is remote from the at least one decorative element is completely covered with the first plastic material, wherein the first plastic material inclusive of the auxiliary film web and/or the second plastic material is/are transparent.

In that respect the plastic materials are to be so selected that the decorative element remains visible at least at one location. An injection molded article which is decorated in that fashion affords optimum protection for both sides of the first decorative element and at the same time permits various optical effects. Thus for example the first decorative element can be seen with a depth effect through a transparent second plastic material on the visible side of the decorated injection molded article and the first plastic material can be visible through any transparent regions which are possibly present in the first decorative element. If the decorated injection molded article is used in such a way that both the first and also the second plastic material form a visible side, the two sides of the first decorative element can be of different configurations and can be respectively viewed through a first transparent plastic material and a second transparent plastic material, possibly also through a transparent auxiliary film web.

It has further proven to be advantageous if at least one second decorative element is arranged on a surface of the first and/or the second plastic material, by a procedure whereby the second decorative element which is preferably provided in the form of a transfer layer of a transfer film on a carrier film is laid together with the decorated first plastic material in the second injection molding mold and thereafter the second plastic injection material is introduced. That results in an injection molded article which has a first decorative element disposed between the first plastic material and the second plastic material and a further second decorative element disposed on the surface of at least one plastic material. With simultaneous decoration of regions of the first plastic material which has already hardened, or also regions of the first decorative element, it will be noted that there must be sufficient input of heat into the second decorative element or sufficient reactivity with the second decorative element in order also to provide a satisfactory bonding join at those locations. In that way further particular optical effects can be achieved.

In that respect it is possible for the second decorative element on its side remote from the first and/or the second plastic material to be at least partially covered in a third injection molding mold with a third plastic injection material and mechanically fixedly joined. The third plastic material thus also affords optical enhancement for the second decorative element and mechanical protection from damage.

In that respect it is on the one hand advantageous for the first plastic material and the second plastic material to be formed from substantially identical materials. In that respect, the term substantially identical materials is used to denote those whose chemical and physical properties are substantially identical. In that respect, those materials which are only differently colored are also considered. The use of identical materials improves the stability in respect of shape of the injection molded article produced as thermal expansion and the shrinkage characteristics of the plastic injection materials upon hardening are the same. That results in a lesser degree of distortion of the injection molded article and increased dimensional accuracy.

In addition the first and second plastic materials can also be formed from materials with different chemical and/or physical properties. In that respect it is found to be particularly advantageous that materials which are incompatible with each other can also be used as the plastic materials, in which respect the first decorative element or the first decorative element inclusive of the auxiliary film web functions as a bonding agent.

It has proven to be advantageous if ABS, an ABS/PC mixture, PC, PMMA, SAN, ASA, TPO, PP or mixtures of at least two of those materials, insofar as they are compatible, are used for the first plastic material. The use of PMMA, ASA, ABS, SAN, PA, PC, PP or mixtures of at least two of those materials, insofar as they are compatible, has proven to be advantageous for the second plastic material. Plastic materials of that kind can be reliably processed on injection molding machines, wherein the first or second plastic material is preferably injected into cooled injection molding molds, in an at least partially molten state.

It has further proven appropriate if the second plastic material is formed from reactively cross-linking plastic materials, in particular reaction resins, a polyurethane, polyamine or polyurea system. Those materials are processed by means of reaction injection molding, in which case the usual procedure is that two components, possibly with the addition of catalysts or other adjuvants, are intensively mixed shortly prior to injection into the injection molding mold, and hardening is effected by cross-linking in the injection molding mold. In that case the injection molding mold can optionally be preheated in order to increase the reaction rate.

Thus for example the materials PP for the first plastic material and PMMA for the second plastic material, which are incompatible with each other, can advantageously be fixedly bonded without any problem to a suitably configured decorative element or decorative element inclusive of an auxiliary film web, as a bonding agent.

It has particularly proven worthwhile if in case a) the one side of the two sides of the first decorative element is formed by a first layer which is chemically compatible with respect to the first plastic material and which at least partially softens at an injection temperature for the first plastic material. In that way the first layer can be mechanically particularly fixedly joined to the first plastic material.

In case b) preferably the auxiliary film web is chemically compatible with respect to the first plastic material, wherein the auxiliary film web at least partially softens at an injection temperature for the first plastic material and is mechanically firmly joined to the first plastic material, and wherein the second side of the first decorative element is afforded by a first layer which is chemically compatible with respect to the auxiliary film web, which at least partially softens on stamping on to the auxiliary film web and which is mechanically firmly joined to the auxiliary film web.

Accordingly, for the transfer film or the decorative element respectively, it has proven to be advantageous if in case a) the first layer and in case b) the auxiliary film web is chemically compatible with respect to a first plastic material from the group comprising ABS, ABS/PC mixtures, PC, SAN, ASA, TPO or PP and the first layer at least partially softens at an injection temperature for the first plastic material or the first layer at least partially softens in the operation of stamping on to the auxiliary film web. A first layer which is of such a nature permits a mechanically particularly firm join for the decorative element to the first plastic material and to the auxiliary film web respectively.

It is further advantageous if in case a) the other side of the two sides of the first decorative element and in case b) the first side of the decorative element is formed by a second layer which is chemically compatible with respect to the second plastic material and which preferably at least partially softens at an injection temperature for the second plastic material. A second layer of that kind can also be mechanically particularly firmly joined to the second plastic material. In that respect, a layer thickness in the range of between 3 and 15 μm is advantageous for the second layer in order to ensure sufficient thermal stability thereof to prevent it from being washed out of the second plastic material by, in particular hot, injection molding material. A thicker second layer can have an adverse effect on the optical quality of decoration of the first plastic material as layer detachment phenomena, referred to as flakes, can occur when dealing with the first plastic material in the edge region of the first decorative element, and those flakes are included upon injection of the second plastic material and impair the optical appearance.

Thus, for the transfer film or the first decorative element respectively it has proven to be advantageous if the second layer is chemically compatible with respect to a second plastic material from the group comprising PMMA, ASA, ABS, SAN, PA or PC and the second layer at least partially softens at an injection temperature for the second plastic material. Such a configuration for the second layer makes it possible to produce a mechanically particularly firm join between the second layer and the second plastic material.

For the transfer film or the first decorative layer respectively it has further proven to be advantageous if the second layer is chemically compatible with a second plastic material which is formed from reactively cross-linking plastic materials, in particular reaction resins, or a polyurethane, polyamine or polyurea system.

In particular a decorated injection molded article has proven advantageous, which as the first plastic material has an ABS/PC mixture and as the second plastic material PMMA, while the second layer as the main constituent has a polymethylmethacrylate with a molecular weight of about 100,000 g/mol and a glass transition temperature Tg of about 120° C.

For the second plastic material it is advantageous if, considered perpendicularly to the plane of the first decorative element, it is of a thickness in the range of between 1 and 10 mm, preferably in the range of between 3 and 5 mm. A second plastic material of that kind permits a sufficient depth effect in regard to the decorative element and adequate protection for same from mechanical damage.

The plastic material used for the injection molding can preferably be colored with a coloring agent which is preferably a transparent coloring agent. It will be noted however that it is also possible to use metal particles or pigments, in particular thermochromic or photochromic pigments. Particularly attractive optical effects are achieved if the first plastic material and the second plastic material are colored differently and/or are of different transparencies. It will be appreciated in that case that, if an auxiliary film web is provided, it will also be transparent.

The depth effect in regard to the first decorative element is preferably further enhanced if in case a) it reproduces raised portions and depressions in the first plastic material joined thereto. Surface texturing of the first plastic material is achieved for example by structuring or polishing of the surfaces of the injection molding mold, which come into contact with the transfer film or the decorative element. In that case, that surface of the injection molding mold may be structured or polished over its entire area or only partially.

In addition the second plastic material can also have a three-dimensional structure on its surface that is remote from the first decorative element. Surface texturing of the second plastic material can be achieved for example by structuring or polishing of the surfaces of the injection molding mold, which come into contact with the second plastic material. That surface of the injection molding mold can in that case also be structured or polished over its entire area or only partially. Such a three-dimensional structure in the visible region of the decorated injection molded article can be superposed with the depth effect in respect of the first decorative element and/or optical effects of the decorative layer of the decorative element, in such a way that once again a particular optical effect is achieved.

If in case a) the first decorative element has at least partially a three-dimensional relief structure such as diffractive structures or holograms, they can be superposed with the raised portions and depressions in the first plastic material joined thereto and/or with the three-dimensional structure in the surface of the second plastic material, that is remote from the first decorative element. If in case b) the first decorative element has at least partially a three-dimensional relief structure such as diffractive structures or holograms, they can be superposed with raised portions and depressions in the auxiliary film web joined thereto and/or with a three-dimensional structure in the surface of the second plastic material, that is remote from the first decorative element. In that way it is possible to produce lens effects, mattings or complicated and expensive structurings such as for example high-value wood structures.

It has proven to be particularly advantageous for the decorative element if it has at least one decorative layer between the first and second layers. It will be noted however that the decoration can also already be provided by the first and/or the second layer. In that respect suitable decorative layers are for example metal layers which involve the full surface area or which are partial, at least partial interference layers, at least partial color layers, at least partially arranged layers with relief structures such as macroscopic relief structures, diffractive structures or holograms or also pigmented layers which are provided with fluorescent, phosphorescent, thermochromic or photochromic pigments or pigments with viewing angle-dependent color change effects. When using such decorative layers however it is to be noted that nonetheless a firm bond is still retained between the first and the second layers of the decorative element so that separation of the first plastic material and the second plastic material of the decorated injection molded article in the region of the decorative layers is prevented or at least made markedly more difficult, during the injection molding operations and also thereafter. A suitable decorative layer is therefore used which has an adequate level of thermal resistance in order to prevent the decoration from being washed away by hot injection molding material, at least of the first plastic material. Thus a lacquer based on polymethylmethacrylate with a glass transition temperature Tg of about 120° C. and PVC copolymers with a vinyl chloride content of between 85 and 95% with a glass transition temperature Tg of about 100° C. can be formulated as the decorative layer, for example for a multi-colored wood decoration.

In regard to the transfer film, it has proven desirable if the first and/or the second layer of the decorative element are in the form of a lacquer layer or an adhesive layer. If for example an adhesive layer is used as the first layer, all bonding agents which are usually employed in IMD-films are suitable for same. For the lacquer layer, attention is also to be paid to good adhesion to the plastic material to be bonded thereto. Such a lacquer or adhesive layer can also be of an only partial nature in order for example to permit bonding to decorative layers of the decorative element.

It is also advantageous if the first layer and/or the second layer of the decorative element is/are transparent. A transparent first and/or second layer of the decorative element means that decorative layers arranged therebeneath can be easily seen. It is particularly preferred in that respect if the first layer is in the form of an adhesive layer and the second layer is in the form of a transparent lacquer layer or the first layer and the second layer are both in the form of transparent lacquer layers. It is important in that respect however in particular that there is sufficient compatibility of the first and/or the second layer with the first plastic material or the auxiliary film web or the second plastic material respectively.

It is advantageous for the release layer if it is applied to the carrier film, preferably of PET, in a layer thickness of between 0.2 and 2 g/square meter (dry). A release layer of that kind can be easily detached from the transfer layer with the carrier film which is preferably of a thickness in the region of between 23 and 100 µm without residues of the release layer remaining on the transfer layer.

The formation of the release layer, the first layer, the decorative layer or layers and the second layer on the carrier film of the transfer film is preferably effected by intaglio printing or screen printing, in which respect it will be noted that in principle it is also possible to use digital printing, flexoprinting or offset printing, in particular in regard to decorative layers. In addition the use of a casting process for the production of those layers has proven appropriate.

A process has proven to be appropriate in which the first plastic injection material is injected in a horizontal or vertical injection molding machine in an at least partially molten state on to the first layer of the transfer film or the auxiliary film web, with initial injection being effected either directly by way of a hot runner, a columnar gate or a 3-plate tool or indirectly by way of a tunnel gate or a film gate.

In contrast for the operation of injecting the second plastic injection material, it is preferable if it is also injected in the at least partially molten state, if it is injected in a horizontal or vertical injection molding machine, with injection being effected indirectly by way of a tunnel gate or a film gate. The thermal stress on the second layer is thereby kept as low as possible, with no injection marking being left behind. That is advantageous in particular when the second plastic material forms the visible region of the decorated injection molded article.

If the second plastic injection material is processed by means of reaction injection molding, it is possible to operate both with direct and also indirect injection as a thermal loading on the second layer does not occur or occurs only to a very slight degree.

The sequence of the injection molding applications can in principle be freely selected but it is appropriate from the point of view of production engineering firstly to produce a base part and to apply the plastic material for the visible side in a second working operation so as to minimise the risk of damage to the visible side.

BRIEF DESCRIPTION OF THE DRAWINGS

FIGS. 1 through 7 are intended to describe the invention by way of example. In the Figures:

FIG. 1 shows the structure of a transfer film according to the invention,

FIG. 2 shows a first plastic material decorated with a first decorative element, FIG. 3 shows a further first plastic material decorated with a further first decorative element, FIG. 4 shows a decorated injection molded article with a first plastic material, a second plastic material and a first decorative element between the first and the second plastic materials, FIG. 5 shows a decorated injection molded article which, besides a first decorative element between a first plastic material and a second plastic material, has a second decorative element on the side of the second plastic material that is remote from the first decorative element, FIG. 6 shows a further decorated injection molded article which besides a first decorative element between a first plastic material and a second plastic material which is applied only region-wise also has a second decorative element, and FIG. 7 shows a decorated injection molded article with a first plastic material, a second plastic material and a first decorative element including an auxiliary film web between the first and second plastic materials.

DETAILED DESCRIPTION OF THE INVENTION

Figure 1:
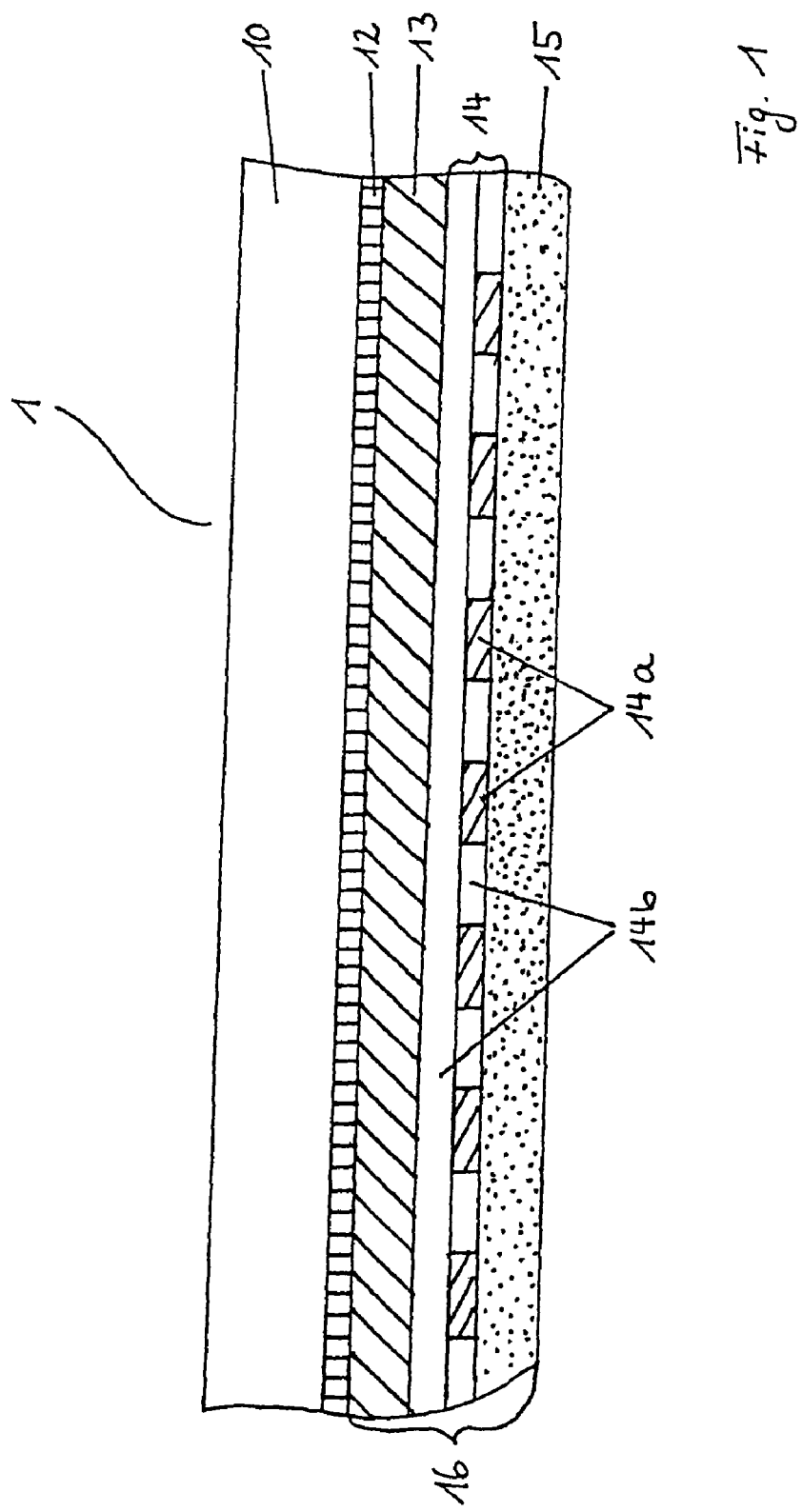

FIG. 1 shows a transfer film with a carrier film 10 of PET, which is of a layer thickness of 50 μm. A release layer 12 of a UV-hardened, highly cross-linked plastic material is arranged on one side of the carrier film 10.

The release layer 12 was formed by UV irradiation of the following composition:

| | |
|---|---|
| 25 parts | Methyl ethyl ketone |
| 25 parts | Ethyl acetate |
| 5 parts | Cyclohexanone |
| 18 parts | Polymethylmethacrylate (molecular weight 60,000 g/mol) |
| 25 parts | Dipentaerythritolpentaacrylate |
| 2 parts | Photoinitiator type I (for example Irgacure ® 1000 from Ciba Geigy) |

Alternatively the release layer 12 can be acid-hardened and formed from the following composition:

| | |
|---|---|
| 10 parts | Ethanol |
| 10 parts | Isopropanol |
| 5 parts | Methyl ethyl ketone |
| 10 parts | Toluene |
| 25 parts | Hexamethylmethylmelamine |
| 30 parts | Solution of a hydroxy-functionalised polymethylmethacrylate (60%) in xylene |
| 10 parts | p-toluene sulfonic acid |

Alternatively the release layer 12 can be isocyanate-hardened and formed from the following composition:

| | |
|---|---|
| 15 parts | Butyl acetate |
| 10 parts | Cyclohexanone |
| 40 parts | Solution of a hydroxy-functionalised polymethylmethacrylate (60%) in ethoxy propanol |
| 35 parts | Desmodur ® IL (diisocyanate, available from Bayer, Leverkusen) |

Disposed on the release layer 12 is a second layer 13 of a thickness of 7 μm, which is in the form of a transparent, PMMA-compatible clear lacquer layer. The second layer 13 is formed by a lacquer which as the main constituent has a polymethylmethacrylate of a molecular weight of about 100,000 g/mol and a glass transition temperature Tg of about 120° C. The clear lacquer used is of the following composition:

| | |
|---|---|
| 32 parts | Methyl ethyl ketone |
| 30 parts | Toluene |
| 17 parts | Cyclohexanone |
| 15 parts | Polymethylmethacrylate (molecular weight 100,000 g/mol) |
| 4 parts | Polyvinylchloride mixed polymer with a vinylchloride content of 80-95% |
| 0.5 part | Light protection agent of Hals type |
| 1.5 part | UV absorber (benzotriazol derivatives) |

Disposed on the second layer 13 is a multi-layer decorative layer 14 which has partially provided metal surfaces 14a besides further decorative elements 14b, for example spacer layers, for producing interference effects. Disposed on the decorative layer 14 is a first layer 15 which is in the form of a heat-sealable adhesive layer which is compatible with ABS/PC mixtures. The decorative element 16 is thus composed of the second layer 13, the decorative layer 14 and the first layer 15.

Figure 2:
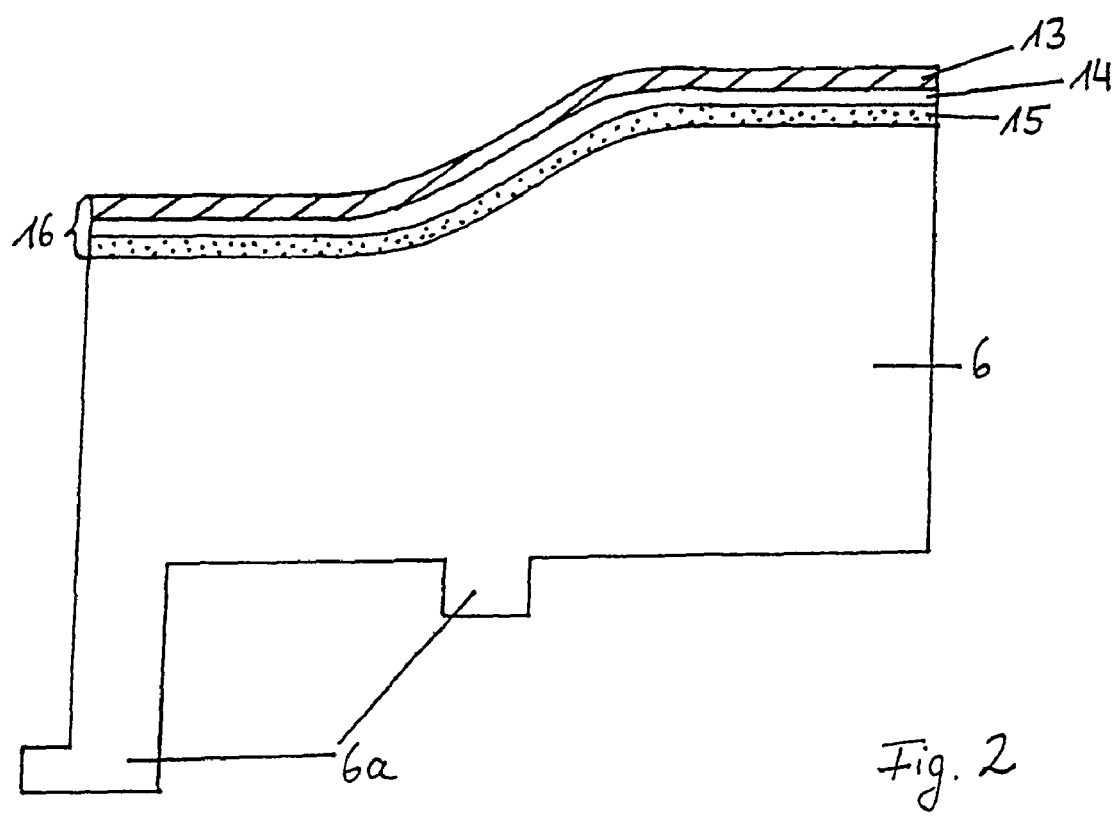

FIG. 2 now shows an injection-molded first plastic material 6 which has been decorated with a decorative element 16 in an inmold injection molding process. In this case the first plastic material 6 is formed from an ABS/PC mixture which is colored opaquely brown. The decorative element 16 is mechanically fixedly joined, with its first layer 15 in the form of an adhesive layer, to a surface of the first plastic material 6. That surface of the first plastic material 6 in this case has a wavy configuration or a three-dimensional structuring which is reproduced by the decorative element 16. FIG. 2 shows the decorative element 16 of the transfer film of FIG. 1 after the carrier film 10 inclusive of the release layer 12 has been removed from the second layer 13 without any residue. The first plastic material 6 decorated with the decorative element 16 can now be joined to a second plastic material, preferably predominantly in the region of the second layer 13, in which respect that is effected in accordance with the invention in a further inmold injection molding procedure. In the case of the first plastic material 6 involved here, the visible side was provided with the decorative element 16, while provided on the side of the first plastic material 6 that is opposite to the decorative element 16, there are the projections 6a, for example for fixing the first plastic material in a vehicle interior.

Figure 3:
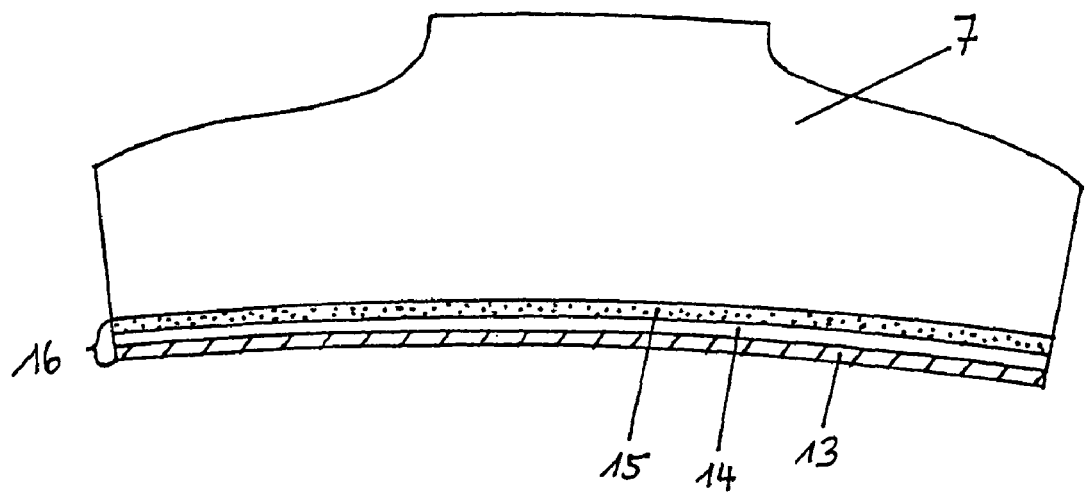

FIG. 3 shows a first plastic material 7 which is formed from plexiglas or polycarbonate and the rear side of which is joined to a decorative element 16. In this case the decorative element 16 is viewed through the first plastic material 7 so that it is necessary to use a transparent adhesive layer 15 in order not to conceal the decoration of the decorative layer 14. In this case the decorative element 16 is of a configuration like the decorative element 16 shown in FIG. 1, in which case the carrier film 10 inclusive of the release layer 12 was removed from the second layer 13 without any residue. The second layer 13 is now available for a join according to the invention to a second plastic material in a further inmold injection molding procedure.

Figure 4:
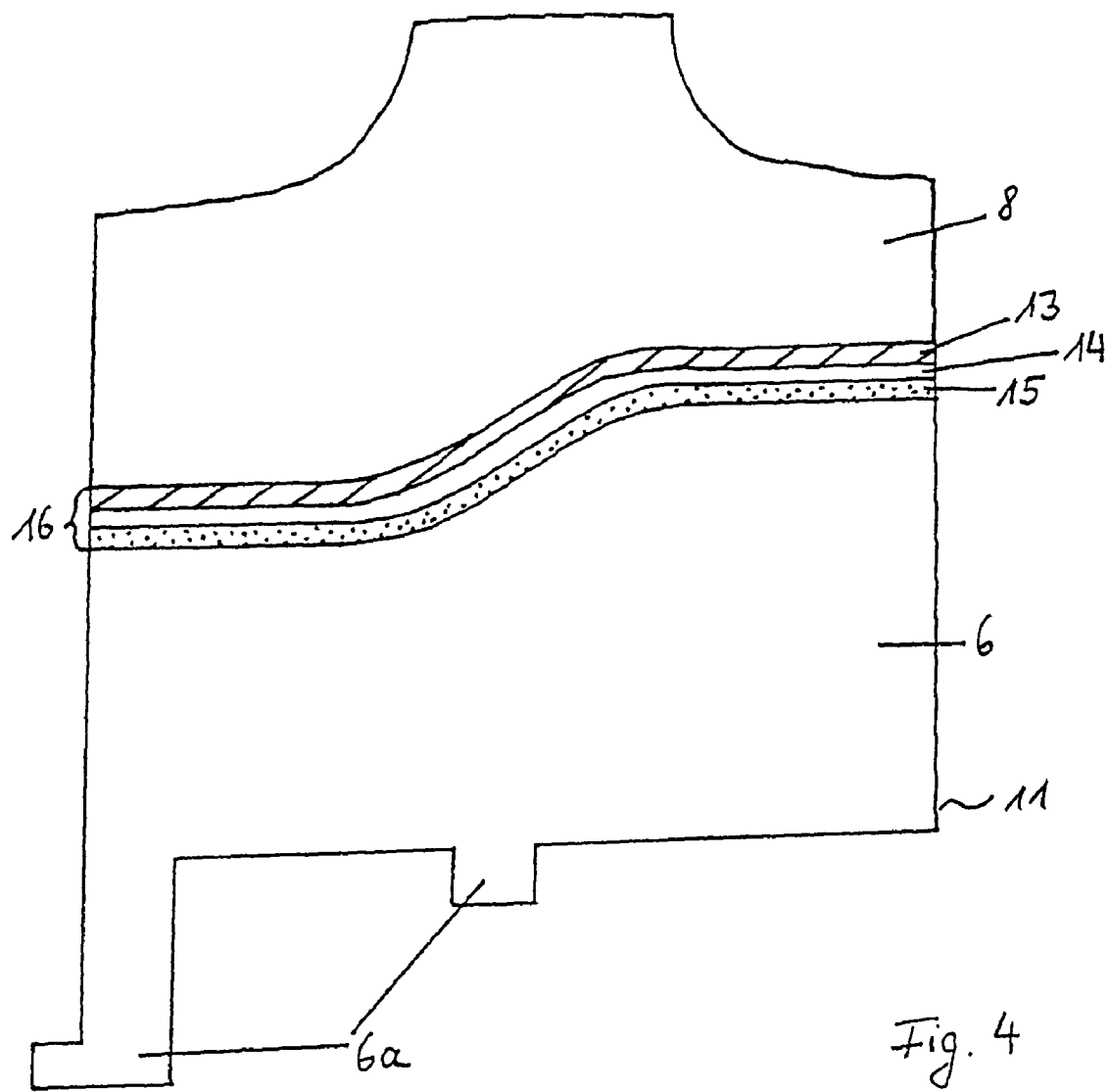

FIG. 4 shows a decorated injection molded article 11 which was formed using the decorated first plastic material 6 of FIG. 2. The decorated first plastic material 6 inclusive of the decorative element 16 of FIG. 2 was for that purpose placed in a further injection molding mold and the remaining cavity in the further injection molding mold was filled with a second plastic injection material which after hardening produces the second plastic material 8. The second plastic material 8 is formed from PMMA which is mechanically fixedly joined to the PMMA-compatible second layer 13 of the decorative element. The decorative layer 14 of the decorative element 16 is visible to the viewer through the second plastic material 8 which is transparent and also through the second layer 13 which is in the form of a clear lacquer layer. Because of the second plastic material 8, this arrangement affords a depth effect which is further enhanced by the structuring of the surface of the second plastic material 8 on its side remote from the decorative element 16. Thus surface structures can be arranged in the region of the first plastic material 6 and the second plastic material 8 relative to each other in such a way as to afford particularly interesting optical effects which, in conjunction with the decorative element 16, still further improve the optical quality of the decorated injection molded article 11.

Figure 5:
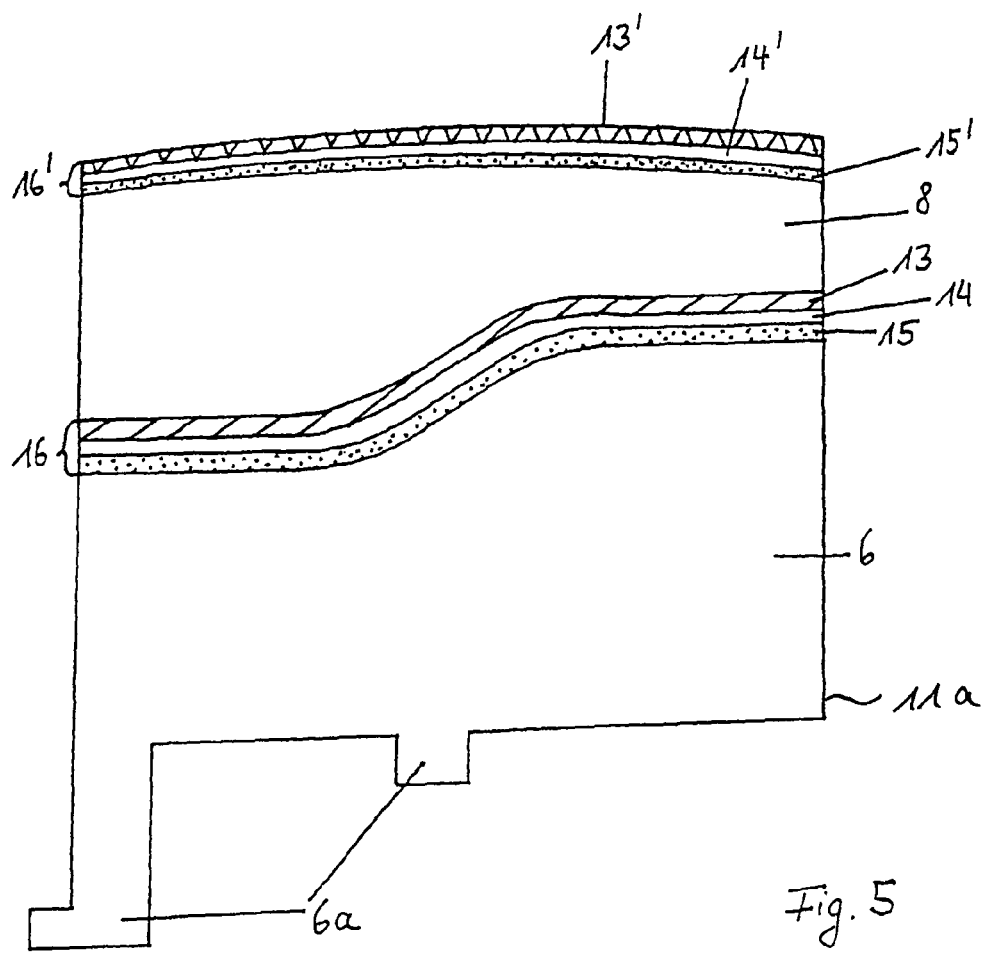

FIG. 5 shows a further decorated injection molded article 11a which once again was produced starting from the decorated first plastic material 6 of FIG. 2. In this case the first plastic material 6 decorated with the decorative element 16 is put into a further injection molding mold, with a transfer film being additionally placed in the injection molding mold. A transfer film is used which, besides a carrier film and a UV-hardened release layer, has a decorative element 16' which includes a transparent protective layer 13', a decorative layer 14' and a first layer 15'. A second plastic injection material is now injected into the further injection molding mold in such a way that it bonds to the second layer 13 of the first decorative element 16 and to the first layer 15' of the second decorative element 16'. The first layer 15' of the second decorative element 16' is in that case in the form of a heat-sealable adhesive layer which after the hot sealing operation is present in transparent clear form. Disposed on the first layer 15' of the decorative element 16' is the decorative layer 14' which is covered by the protective layer 13' which here is in the form of a scratch-resistant clear lacquer layer. The decorative layer 14' disposed under the protective layer 13' is visible through the protective layer 13' by the viewer of the first layer 13' of the second decorative element 16'. Furthermore the decorative layer 14' also has transparent regions so that the second plastic material 8 is visible through the decorative layer 14' and through the first layer 15'. The second plastic material 8 is transparent or at least semi-transparent so that the decorative layer 14 of the first decorative element 16 remains visible to the viewer through the second plastic material 8 and the second layer 13, in the form of a clear lacquer layer, of the first decorative element 16. That affords particularly high-value and convincing three-dimensional effects, while a specific arrangement of the first decorative element 16 in relation to the second decorative element 16' permits a further variation in the optically attainable effects. Coloring of the first plastic material 6 or the second plastic material 8 makes it possible to achieve additional effects which, in combination with the decorative elements 16, 16' used, afford a large number of optical configurational options.

Figure 6:
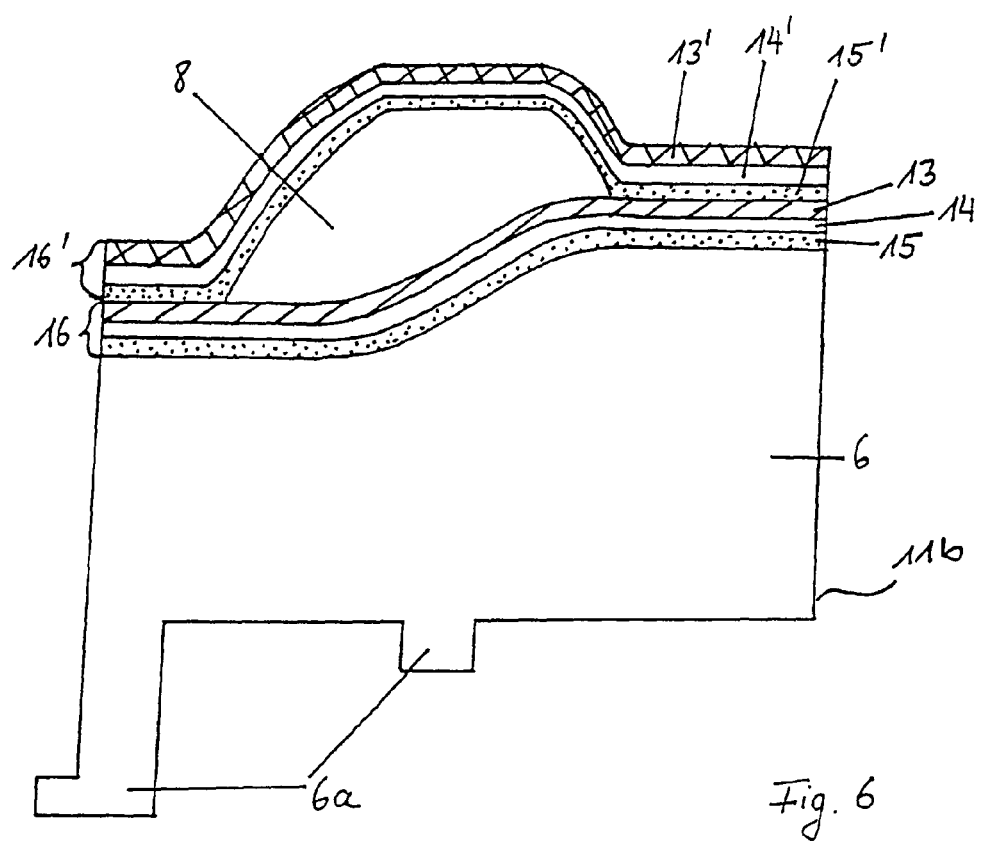

FIG. 6 shows a further decorated injection molded article 11b which was once again produced starting from the decorated first plastic material 6 of FIG. 2. In this case the first plastic material 6 decorated with the decorative element 16 is placed in a further injection molding mold, with a transfer film being additionally placed in the injection molding mold. In that case the transfer film is brought partially into contact with the second layer 13 of the first decorative element 16. A transfer film is used which, besides a carrier film and a UV-hardened release layer, has a decorative element 16' which includes a transparent protective layer 13', a decorative layer 14' and a first layer 15'. A second plastic injection material is now injected into the further injection molding mold in such a way that it bonds partially to the second layer 13 of the first decorative element 16 and partially to the first layer 15' of the second decorative element 16' while the regions of the second layer 13 and the first layer 15', which are directly in contact with each other, also bond by virtue of suitable heating of the injection molding mold used. The first layer 15' of the second decorative element 16' is in that case in the form of a heat-sealable adhesive layer which after heat sealing is present in transparent clear form. Disposed on the first layer 15' of the decorative element 16' is the decorative layer 14' which is covered by the protective layer 13' which is here in the form of a scratch-resistant clear lacquer layer. The decorative layer 14' which is under the protective layer 13' is visible by the viewer of the first layer 13' of the second decorative element 16', through the protective layer 13'. The decorative layer 14' also has transparent regions so that the second plastic material 8 or directly the first decorative element 16 is visible through the decorative layer 14' and through the first layer 15'. The second plastic material 8 is transparent or at least semi-transparent so that the decorative layer 14 of the first decorative element 16 remains visible to the viewer through the second plastic material 8 and the second layer 13, in the form of a clear lacquer layer, of the first decorative element 16. That affords particularly high-value and convincing three-dimensional effects, wherein a specific arrangement of the first decorative element 16 with respect to the second decorative element 16' as well as the second plastic permits a further variation in the effects which can be optically achieved. Coloration of the first plastic material 6 or the second plastic material 8 makes it possible to produce additional effects which, in combination with the decorative elements 16, 16' used, afford a large number of further optical configurational options.

FIG. 7 shows a decorated injection molded article 11c comprising a first plastic material 6, a second plastic material 8' and a first decorative element 16 inclusive of an auxiliary film web 2 between the first and second plastic materials 6, 8'. The decorated injection molded article 11c of FIG. 7 is formed by a transfer film 1 as shown in FIG. 1 being fixed on a flat auxiliary film web 2 by means of hot stamping. The transfer film 1 is thus mechanically firmly joined to the surface of the auxiliary film web 2, with the first layer 15 which is in the form of an adhesive layer. The auxiliary film web 2 inclusive of the transfer film 1 is then subjected to deep drawing and the three-dimensional shape to be seen in FIG. 7 is already produced at that time. The deep-drawn auxiliary film web 2 inclusive of the transfer film 1 is now placed in a first injection molding mold and a first plastic injection molding material is injected behind the auxiliary film web 2 to form the first plastic material 6. In that case the first plastic material 6 is formed from an ABS/PC mixture which is colored opaquely brown. The carrier film 10 inclusive of the release layer 12 is now removed. The decorated first plastic material 6 inclusive of the decorative element 16 and the auxiliary film web 2 are placed in a further injection molding mold and a cavity which remains on the side of the decorative element 16 in the further injection molding mold is filled with a second plastic injection material comprising reactive plastic, which after hardening or cross-linking affords the second plastic material 8'. The second plastic material 8' is of cross-linked transparent polyurethane which mechanically firmly bonds to the second layer 13, which is compatible therewith, of the decorative element. The decorative layer 14 of the decorative element 16 is visible to the viewer through the second plastic material 8' and through the second layer 13 which is in the form of a clear lacquer layer. By virtue of the second plastic material 8', the arrangement here provides a depth effect which is further enhanced by the structuring of the surface of the second plastic material 8' on its side remote from the decorative element 16. In that way surface structures can be arranged in the region of the first plastic material 6 or the auxiliary film web 2 respectively and the second plastic material 8' relative to each other in such a way that particularly attractive optical effects are produced, which in conjunction with the decorative element 16 further improve the optical quality of the decorated injection molded article 11c.

In that respect it is self-evident to the man skilled in the art that the geometries of the decorated injection molded articles shown here can assume any shape which is suitable for injection molding and that the arrangement of the decorative elements can be freely selected. The configuration of a decorative element which is suitable for the process according to the invention can also vary within wide limits. In the simplest case the decorative element can have a plastic film which is compatible with a first and a second plastic material and which forms the first and the second layers, wherein the plastic film is for example partially metallised or printed upon, on one or both sides, to form the decorative layer, so that both sides of the plastic film can be at least partially joined to the injection-molded plastic materials. The only important consideration for the decorative element used, possibly inclusive of the auxiliary film web, is that there is a sufficiently large number of regions at the two sides thereof, which can be fixedly joined to the adjoining plastic injection material. Which individual layer of the decorative element is employed to make a join to the plastic injection materials or to the auxiliary film web respectively can be selected within wide limits. That therefore affords a large number of possible configurational shapes which are embraced by the idea of the invention in a manner that the man skilled in the art can readily comprehend.

The invention claimed is:

1. A process for the production of a decorated injection molded article using at least one decorative element which is formed by a transfer layer of a transfer film and provides a decoration for the injection molded article, the process comprising the steps of:

providing a transfer film having at least a carrier film, a release layer arranged on the carrier film and a transfer layer arranged on the side of the release layer that is remote from the carrier film, the transfer layer forming a first decorative element having a first side and a second side;

stamping the transfer film on to a thermoplastic auxiliary film web in such a way that the transfer layer is mechanically fixedly joined to the auxiliary film web;

shaping the auxiliary film web inclusive of the transfer film by three-dimensional deep-drawing the auxiliary film web inclusive of the transfer film;

arranging the auxiliary film web inclusive of the transfer film in a first injection molding mold;

filling the first injection molding mold with a first plastic injection material in such a way that, on its side remote from the transfer film, the auxiliary film web is at least partially covered with the first plastic injection material;

hardening the first plastic injection material to afford a first plastic material;

taking the first plastic material inclusive of the transfer film joined thereto out of the first injection molding mold;

removing the carrier film inclusive of the release layer from the transfer layer;

arranging the first plastic material decorated with the transfer layer in that way in a second injection molding mold; and at least partially over-injecting at least the still uncovered side of the transfer layer, which corresponds to the first side of the first decorative element, with a second plastic injection material.

2. A process as set forth in claim 1, wherein the first side of the first decorative element is covered completely with the second plastic material and the side of the auxiliary film web that is remote from the at least one decorative element is covered completely with the first plastic material.

3. A process as set forth in claim 1, wherein at least one second decorative element is arranged on a surface of the first and/or the second plastic material by the second decorative element together with the decorated first plastic material being placed in the second injection molding mold and thereafter the second plastic injection material being introduced thereinto.

4. A process as set forth in claim 3, wherein on its side remote from the first and/or the second plastic material, the second decorative element is at least partially covered in a third injection molding mold with a third plastic injection material and mechanically fixedly joined.

5. A process as set forth in claim 1, wherein the transfer film is formed with at least a carrier film, a release layer arranged on the carrier film and the transfer layer arranged on the side of the release layer that is remote from the carrier film, as a decorative element, wherein the transfer layer is formed adjoining the release layer with at least one second layer, adjoining the second layer with at least one decorative layer and adjoining the decorative layer on the side of the transfer film that is remote from the carrier film with at least one first layer, and wherein the release layer is in the form of a plastic layer which is highly cross-linked. by radiation hardening, isocyanate hardening or acid hardening.

6. A process as set forth in claim 5, wherein the first layer is chemically compatible with the auxiliary film web which is formed from a material from the group comprising ABS, ABS/PC mixtures, PC, PMMA, SAN, ASA, TPO or PP and the first layer at least partially softens upon stamping on to the auxiliary film layer.

7. A process as set forth in claim 5, wherein the second layer is chemically compatible with a second plastic material from the group comprising PMMA, ASA, ABS, SAN, PA, PC or PP and the second layer at least partially softens at an injection temperature for the second plastic material.

8. A process as set forth in claim 5, wherein the second layer is chemically compatible with a second plastic material which is formed from reactively cross-linking plastic materials, in particular reaction resins, or a polyurethane, polyamine or polyurea system.

9. A process as set forth in claim 5, wherein the first layer and/or the second layer of the decorative element is/are transparent.

10. A process as set forth in claim 5, wherein the decorative layer arranged between the first layer and the second layer includes an at least partial metal layer and/or an at least partial interference layer and/or an at least partial color layer and/or an at least partially arranged layer with relief structures such as macroscopic relief structures, diffractive structures or holograms, and/or a pigmented layer which has fluorescent, phosphorescent, thermochromic or photochromic pigments or pigments with viewing angle-dependent color change effects.

* * * * *